US008828114B2

(12) United States Patent
Dhiman et al.

(10) Patent No.: US 8,828,114 B2
(45) Date of Patent: Sep. 9, 2014

(54) FILTER ELEMENT WITH FEATURES TO IMPROVE PRE-CLEANING PERFORMANCE, SEALING, AND STRUCTURAL SUPPORT

(75) Inventors: Rajeev Dhiman, Pune (IN); Jim Alonzo, Verona, WI (US); Kelly Detra, Brooklyn, WI (US); Barry Mark Verdegan, Stoughton, WI (US)

(73) Assignee: Cummins Filtration IP Inc., Minneapolis, MN (US)

( * ) Notice: Subject to any disclaimer, the term of this patent is extended or adjusted under 35 U.S.C. 154(b) by 348 days.

(21) Appl. No.: 13/234,309

(22) Filed: Sep. 16, 2011

(65) Prior Publication Data

US 2012/0067014 A1 Mar. 22, 2012

Related U.S. Application Data

(60) Provisional application No. 61/383,621, filed on Sep. 16, 2010.

(51) Int. Cl.
*B01D 46/00* (2006.01)
*B01D 46/24* (2006.01)

(52) U.S. Cl.
CPC .......... *B01D 46/008* (2013.01); *B01D 46/2414* (2013.01)
USPC ................ 55/498; 55/337; 55/459.1; 55/502; 55/510

(58) Field of Classification Search
USPC .......... 55/320, 337, 459.1, 459.2, 459.4, 498, 55/502, 510
See application file for complete search history.

(56) References Cited

U.S. PATENT DOCUMENTS

| 3,745,753 | A | * | 7/1973 | Risse | 55/481 |
| 3,928,007 | A | * | 12/1975 | Jackson | 55/337 |
| 5,545,241 | A | * | 8/1996 | Vanderauwera et al. | 55/490 |
| 5,891,337 | A | | 4/1999 | Keller et al. | |
| 6,039,778 | A | * | 3/2000 | Coulonvaux | 55/498 |
| 6,051,042 | A | * | 4/2000 | Coulonvaux | 55/498 |
| 6,334,887 | B1 | * | 1/2002 | Coulonvaux | 95/273 |
| 6,419,718 | B1 | * | 7/2002 | Klug et al. | 55/320 |
| 6,902,598 | B2 | | 6/2005 | Gunderson et al. | |
| 6,958,083 | B1 | * | 10/2005 | Schmitz et al. | 55/337 |

(Continued)

FOREIGN PATENT DOCUMENTS

| CN | 101048215 | 10/2007 |
| WO | WO-2004/039476 | 5/2004 |
| WO | WO-2008/124437 | 10/2008 |
| WO | WO-2009/019443 | 2/2009 |

OTHER PUBLICATIONS

International Preliminary Report on Patentability, PCT/US2011/051880, date of mailing Mar. 28, 2013.

(Continued)

*Primary Examiner* — Robert Clemente
(74) *Attorney, Agent, or Firm* — Foley & Lardner LLP

(57) ABSTRACT

Disclosed are filter assembly systems that utilize replaceable filter elements. The filter elements may include a ramp or sleeve for redirecting air intake when the filter elements are installed in the filter assembly systems and air is drawn into the systems. The filter elements and assembly systems may utilize co-acting components that mate with each other to at least one of: a) orient and permit mounting of the filter element in the systems; and b) permit mounting of only an authorized filter element in the systems.

25 Claims, 8 Drawing Sheets

(56) References Cited

U.S. PATENT DOCUMENTS

| | | | |
|---|---|---|---|
| 7,070,642 B2 * | 7/2006 | Scott et al. | 55/498 |
| 7,097,694 B1 | 8/2006 | Jaroszczyk et al. | |
| 7,125,490 B2 | 10/2006 | Clendenning et al. | |
| 7,276,098 B2 | 10/2007 | Koslow | |
| 7,282,077 B2 | 10/2007 | Honisch et al. | |
| 7,314,558 B1 | 1/2008 | Jaroszczyk et al. | |
| 7,323,105 B1 | 1/2008 | Janikowski et al. | |
| 7,323,106 B2 | 1/2008 | Jaroszczyk et al. | |
| 7,413,588 B2 | 8/2008 | Holzmann et al. | |
| 7,537,631 B2 | 5/2009 | Scott et al. | |
| 7,540,895 B2 | 6/2009 | Furseth et al. | |
| 7,563,300 B2 | 7/2009 | Nishiyama et al. | |
| D600,790 S | 9/2009 | Nelson et al. | |
| 7,625,419 B2 | 12/2009 | Nelson et al. | |
| 7,648,546 B2 | 1/2010 | Haberkamp et al. | |
| 7,658,777 B2 | 2/2010 | Kopec et al. | |
| 7,662,203 B2 * | 2/2010 | Scott et al. | 55/498 |
| 7,662,216 B1 | 2/2010 | Terres et al. | |
| 7,740,678 B2 | 6/2010 | Gunderson et al. | |
| 7,753,982 B2 | 7/2010 | Merritt | |
| RE41,713 E | 9/2010 | Gunderson et al. | |
| 7,789,926 B2 | 9/2010 | Rieger et al. | |
| 7,799,108 B2 | 9/2010 | Connor et al. | |
| 7,828,870 B1 | 11/2010 | Rech et al. | |
| 7,879,125 B2 | 2/2011 | Haberkamp et al. | |
| RE42,174 E | 3/2011 | Gunderson et al. | |
| 7,931,725 B2 | 4/2011 | Wydeven et al. | |
| 7,959,703 B2 | 6/2011 | Merritt et al. | |
| 7,976,601 B2 | 7/2011 | Xu et al. | |
| 7,981,183 B2 | 7/2011 | Nepsund et al. | |
| 7,981,186 B2 * | 7/2011 | Schrage et al. | 55/498 |
| 7,988,757 B2 * | 8/2011 | Scott et al. | 55/498 |
| 7,993,422 B2 | 8/2011 | Krisko et al. | |
| 8,038,756 B2 * | 10/2011 | Iddings et al. | 55/502 |
| 8,177,874 B2 * | 5/2012 | Bittle et al. | 55/478 |
| 8,177,971 B2 * | 5/2012 | Bittle et al. | 210/232 |
| 8,216,335 B2 * | 7/2012 | Scott et al. | 55/498 |
| 8,394,166 B2 * | 3/2013 | Scott et al. | 55/497 |
| 8,460,425 B2 * | 6/2013 | Scott et al. | 55/498 |
| 8,545,588 B2 * | 10/2013 | Iddings et al. | 55/502 |
| 2008/0190082 A1 | 8/2008 | Scott et al. | |
| 2009/0126324 A1 | 5/2009 | Smith et al. | |
| 2010/0146920 A1 | 6/2010 | Iddings et al. | |

OTHER PUBLICATIONS

International Search Report for PCT/US2011/051880 dated Jan. 20, 2012.

Written Opinion for PCT/US2011/051880 dated Jan. 20, 2012.

* cited by examiner

FILTER ELEMENT WITH FEATURES TO IMPROVE PRE-CLEANING PERFORMANCE, SEALING, AND STRUCTURAL SUPPORT

CROSS-REFERENCE TO RELATED APPLICATION

The present application claims the benefit under 35 U.S.C. §119(e) to U.S. Provisional Application No. 61/383,621, filed on Sep. 16, 2010, the content of which is incorporate herein by reference in its entirety.

BACKGROUND

The field of the invention relates to filter assemblies and systems. In particular, the field of the invention relates to filter assemblies for air intake systems. Filter assemblies, including assemblies that utilize annular filter elements, are known in the art. (See, e.g., U.S. Pat. Nos. 7,993,422; 7,981,183; 7,976,601; 7,959,703; 7,931,725; RE42,174; 7,879,125; 7,828,870; RE41,713; 7,799,108; 7,789,926; 7,753,982; 7,740,678; 7,662,216; 7,648,546; 7,625,419; D600,790; 7,563,300; 7,540,895; 7,413,588; 7,323,106; 7,323,105; 7,314,558; 7,282,077; 7,276,098; 7,125,490; 7,097,694; and 6,902,598; the contents of which are incorporated herein by reference in their entireties).

In order to ensure reliable, robust engine operation, engines must be protected from contaminants entering via the air intake system. Filter assembly systems utilize filter elements in this regard to remove contaminants from air intake. In order to improve filter assembly efficiency, it is desirable to incorporate pre-cleaner features into components of the filter assembly. A further issue in filter assemblies is the installation or attempted installation of incorrectly oriented filter elements or unauthorized filter elements that may adversely impact the engine. It is desirable to incorporate features into filter assembly systems in order to reduce or prevent installation of incorrectly oriented filter elements or unauthorized filter elements within filter assembly systems. Accordingly, disclosed herein are pre-cleaner features and installation elements that address these issues.

SUMMARY

Disclosed are replaceable filter elements and filter assemblies comprising a housing chamber for mounting the filter element. The filter element typically is annular and comprises filter media and end seal caps located at each end of the filter media.

In some embodiments, the filter element may comprise a ramp adjacent to, and optionally integrated with, an end seal cap of the filter element. The ramp may be present on a sleeve that is adjacent to, and optionally integrated with, an end seal cap of the filter element. The housing typically comprises a chamber, and the housing further comprises an inlet for drawing air into the chamber, and an outlet for emitting air from the chamber. Typically, the inlet is located radially on the housing and the outlet is located axially on the housing. The housing typically comprises end caps located at each of the housing chamber. When the filter element is mounted in the housing chamber, the end seal caps of the filter element typically contact and seal against the end caps of the housing chamber. Suitable seals may include facial seals and radial seals. Further, when the filter element is mounted in the housing chamber, the ramp of the filter element typically aligns with the chamber at the inlet, optionally seals against an edge of the inlet, and directs air around the filter media and axially away from the inlet when air is drawn through the inlet.

In further embodiments, at least one of the end caps of the housing chamber and at least, one of the end seal caps of the filter element comprise first and second co-acting components mating with each other to at least one of: a) orient and permit mounting of the filter element in the housing chamber, for example, where an edge of the ramp is oriented adjacent to an edge of the inlet and aligns with the edge of the inlet and optionally seals against the edge of the inlet; and b) permit mounting of only an authorized filter element in the housing chamber, namely a filter element comprising the second co-acting keyed component to mate with the first co-acting keyed component of the housing chamber. Suitable co-acted keyed components may include male and female chords, tabs and slots, and tapered faces. Optionally, the end seal cap of the filter element may be tapered, for example, the end seal cap that seals at the outlet end of the housing chamber, and the corresponding end cap of the housing chamber may be correspondingly tapered for sealing against the tapered face of the end seal cap of the element.

DETAILED DESCRIPTION

Figure 1:
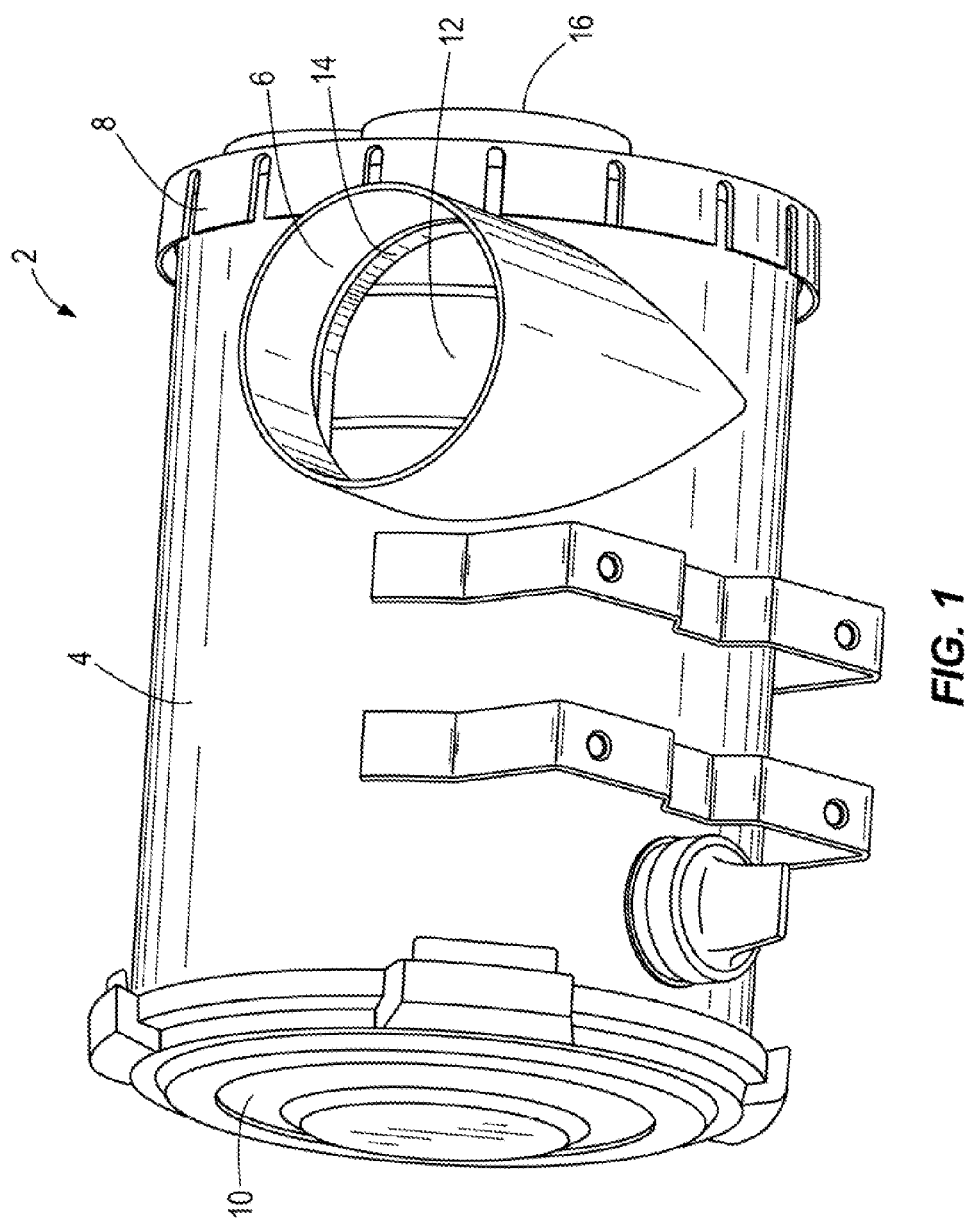
FIG. 1 illustrates one embodiment of a filter assembly as contemplated herein.

Disclosed are replaceable filter elements and filter assemblies comprising a housing chamber for mounting the filter element. In some embodiments, the filter elements include a ramp that optionally may be present on a circumferential sleeve located at one end of the filter element. In other embodiments, the filter elements and assemblies may utilize keyed components for orienting and permitting mounting of the filter element in a chamber of the housing, for example, orienting the ramp adjacent to an edge of an inlet of the housing chamber and permitting mounting of only an authorized filter element in the housing chamber.

The disclosed filter assemblies may include components that may be cylindrical, substantially cylindrical, or non-cylindrical (e.g., filter elements or housing chambers that are cylindrical, substantially cylindrical, or non-cylindrical). In some embodiments, the components of the disclosed filter assemblies are oval-shaped, racetrack-shaped, obround-shaped, or another closed-loop shape.

The disclosed filter assemblies may include components that are substantially cylindrical. As used herein, an component that is "substantially cylindrical" may be defined as a component that has a circular cross-section or a component that has a non-circular cross-section (e.g., an oval cross-section), where a longest diameter of the non-circular cross-section and the shortest diameter of the non-circular cross-section $d_{min}$ meet the following criteria:

$$(d_{max}-d_{min})/d_{min} \leq 20\%.$$

In one embodiment, the filter assemblies comprise a filter element which incorporates an integrated pre-cleaner ramp which improves pre-cleaner efficiency and maximizes the service interval. The ramp may be present on a circumferential sleeve that is located at an end of the filter element and adjacent to an end seal cap of the filter element. The ramp or sleeve also may provide structural support to the filter element in the event of a radial impact such as might occur if the filter element was dropped or received a radial blow during servicing. Typically, the ramp is aligned or adjacent to a radial inlet on the housing to direct intake air spirally around the filter element and axially away from the inlet. Optionally, the ramp may seal against an edge of the inlet. In order to ensure proper installation orientation, the sealing geometry on both the filter element and housing may be designed with a mating interface to facilitate or ensure proper installation of the filter element.

The disclosed filter elements may comprise a ramp that enhances pre-cleaner efficiency in filter assembly systems in which the filter element is utilized. For example, the disclosed filter elements may exhibit >20% enhanced pre-cleaner efficiency. By adding the ramp to the filter element, improved pre-cleaner performance can be achieved without adding significant cost to a filter assembly system.

Typically, the orientation of the filter element in the housing chamber is selected in order to obtain the pre-cleaner efficiency improvements disclosed herein. Desirable orientation may be achieved via first and second co-acting components present on the housing (for example, present on the housing chamber at an end cap of the housing chamber) and the filter element (for example, present of an end seal cap of the filter element). The components may mate with each other, for example as male and female components, to at least one of: a) orient and permit mounting of the filter element in the housing; and b) permit mounting of only an authorized filter element in the housing, namely a filter element comprising the second co-acting keyed component to mate with the first co-acting keyed component of the housing. As such, the co-acting components may prevent improper installation of a filter element in the housing. The co-acting components also may prevent installation of an incorrectly sized filter element, for example, a filter element having a radial seal of similar but incorrect size.

In addition, the ramp or sleeve may provide radial structure to the filter element and prevent damage from radial impact during installation or removal. For example, radial impacts may occur from dropping element at certain angles or during shipment where a shipping package is crushed. In these instances, the ramp or sleeve may guard against radial damage to the filter element.

In some embodiments of the disclosed filter assemblies, a pre-cleaner ramp or sleeve component may be potted in urethane to provide a structural member of the filter element and improve pre-cleaner efficiency of filter assemblies in which the filter element is utilized. Alternatively, the pre-cleaner ramp or sleeve could be an integral part of the end seal member made of a thermoplastic, into which the ends of the filter media are embedded.

The geometry of an end seal cap of the filter element may be designed to interface with a corresponding geometry in a housing chamber in which the filter element is mounted to ensure proper filter installation/orientation (e.g., corresponding geometry present on an end cap of the housing chamber). In further embodiments, the disclosed filter assemblies may include one or more of the following features: (1) a pre-cleaner ramp or sleeve component integral to the assembly (e.g., integral to the filter element); (2) a ramp or sleeve that provides radial structural support to the filter element; (3) a seal geometry on the filter element and corresponding mating geometry on the housing to prevents improper orientation or installation of an unauthorized filter element; and (4) a tapered face on an open end of the filter element and a corresponding tapered face on the housing which may facilitate installation and removal of the filter element during servicing.

Referring now to the figures, FIG. 1 illustrates one embodiment of a filter assembly 2 as contemplated herein. The filter assembly includes a housing chamber 4 having an inlet 6 and an outlet 16. Optionally, the inlet is a radial inlet and the outlet is an axial outlet. The housing chamber includes end caps 8 and 10. As shown in FIG. 1, one end cap is closed 10 and one end cap 8 includes the outlet 16 or otherwise is open. A filter element 12 is mounted within the housing chamber 4 and includes a ramp 14 that aligns with the inlet 6 and directs influent air around the filter element 12.

Figure 2:
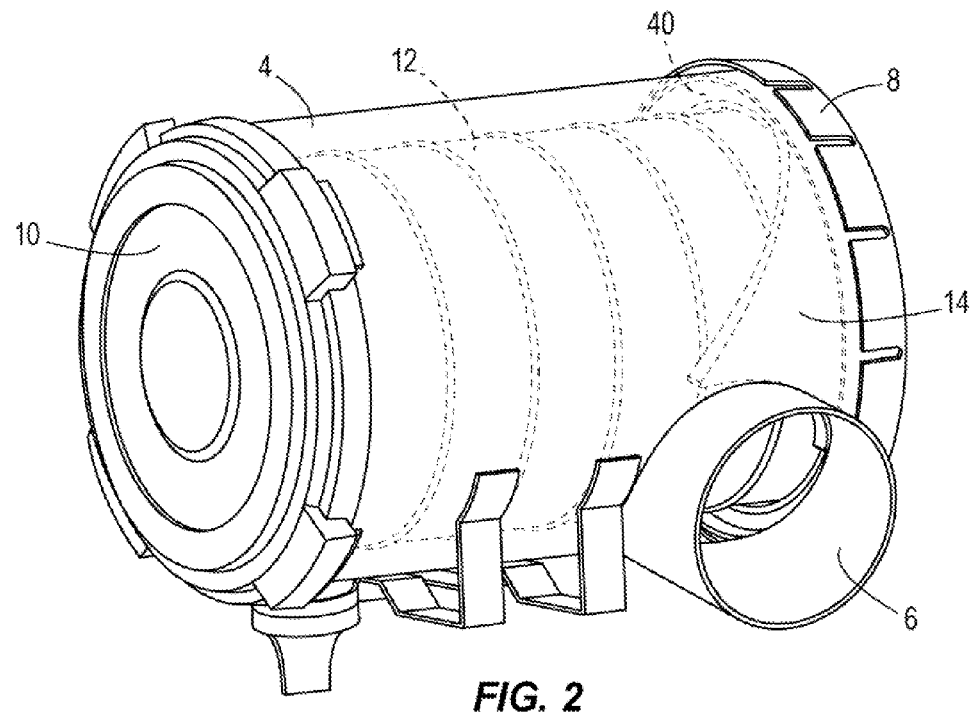
FIG. 2 illustrates a view of one embodiment of a filter element mounted in end caps of a housing chamber.
Figure 3:
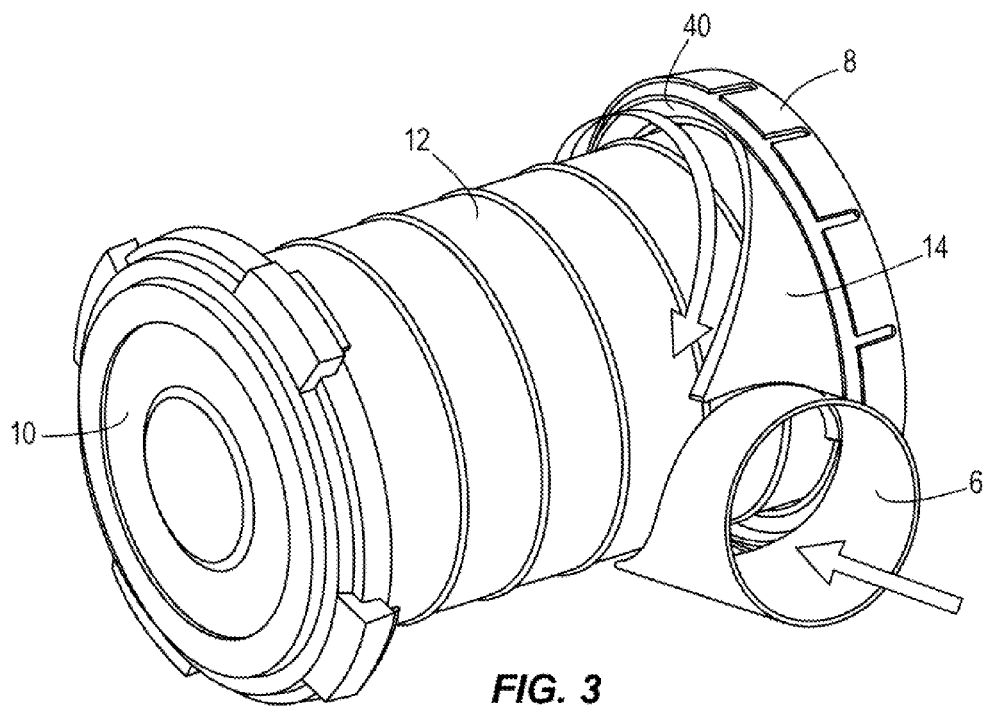
FIG. 3 illustrates a view of one embodiment of a filter element mounted in end caps of a housing chamber with the housing chamber not disclosed for clarity.

FIG. 2 illustrates a view of one embodiment of a filter element 12 mounted in the end caps 8, 10 of the housing chamber 4. As shown in FIG. 3, the inlet 6 aligns with the ramp 14 which directs influent air around the filter element 12 and axially upward as illustrated by arrows. The housing chamber 4 is not shown in FIG. 3 to illustrate internal air flow.

Figure 4:
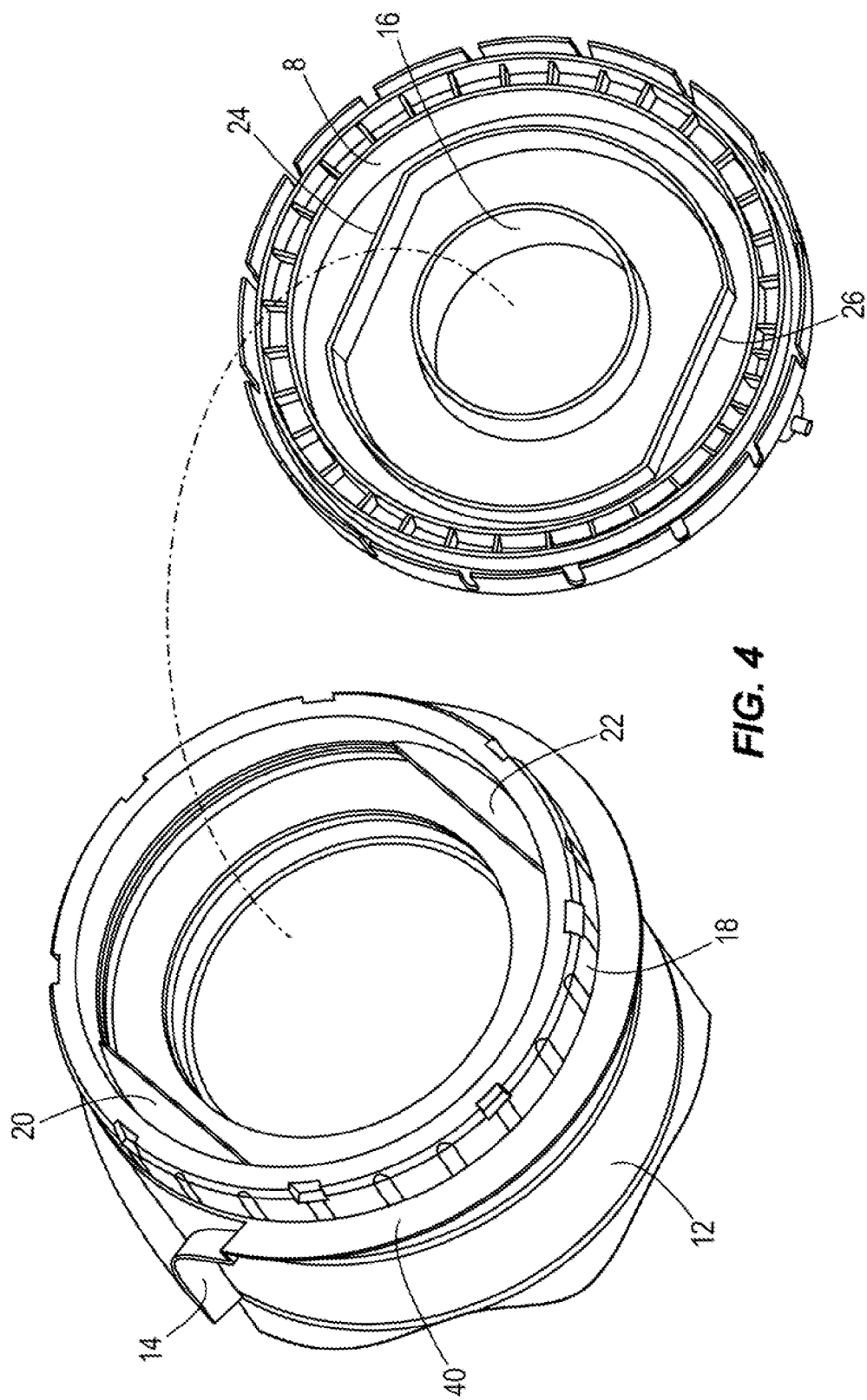
FIG. 4 illustrates one embodiment of an end seal cap of a filter element and a corresponding and mating end cap of a housing chamber.

FIG. 4 illustrates one embodiment of an end seal cap 18 of a filter element 12 and a corresponding and mating end cap 8 of a housing chamber having an outlet 16 for emitted air. The end seal cap 18 of the filter element 12 includes internal chords 20, 22, which mate with corresponding internal chords 24, 26 on the end cap 8 of the housing chamber and orient the filter element 12 within the housing chamber, for example, such that the ramp 14 aligns with the inlet 6 of the housing chamber 4. The shape bounded by the internal chords and inner perimeter of the circle formed by the end seal cap 18 may be any shape (e.g., a non-circular shapes such as an oval, rectangle with rounded corners, racetrack, etc. to facilitate proper orientation of the element).

Figure 5:
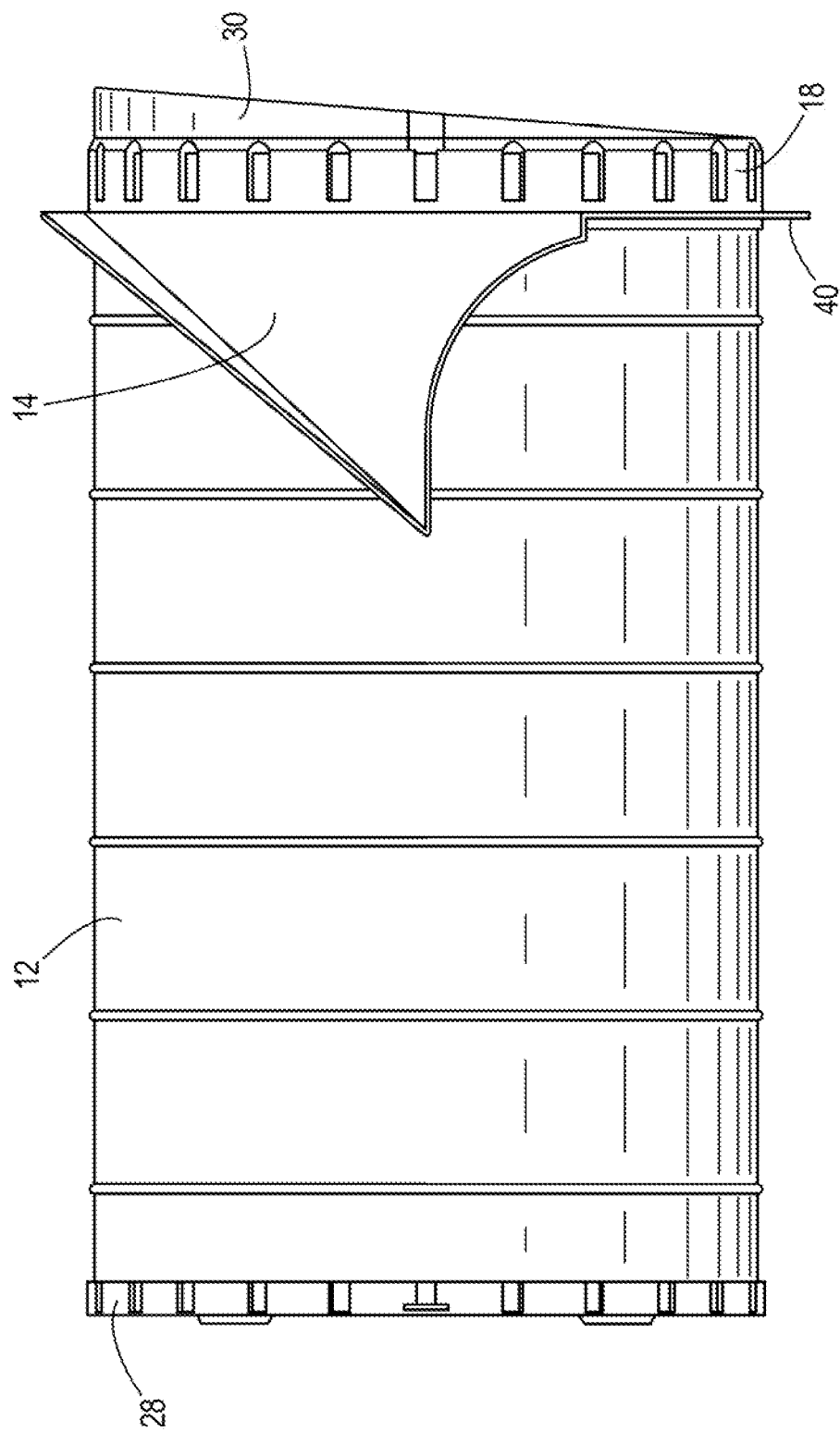
FIG. 5 illustrates one embodiment of a filter element having an end seal cap with a tapered face.

FIG. 5 illustrates one embodiment of a filter element 12 having an end seal cap 18 with a tapered face 30 and an opposing end cap seal 28. The tapered face 30 typically mates with a corresponding tapered face on an end cap of a housing chamber (not shown).

Figure 6A:
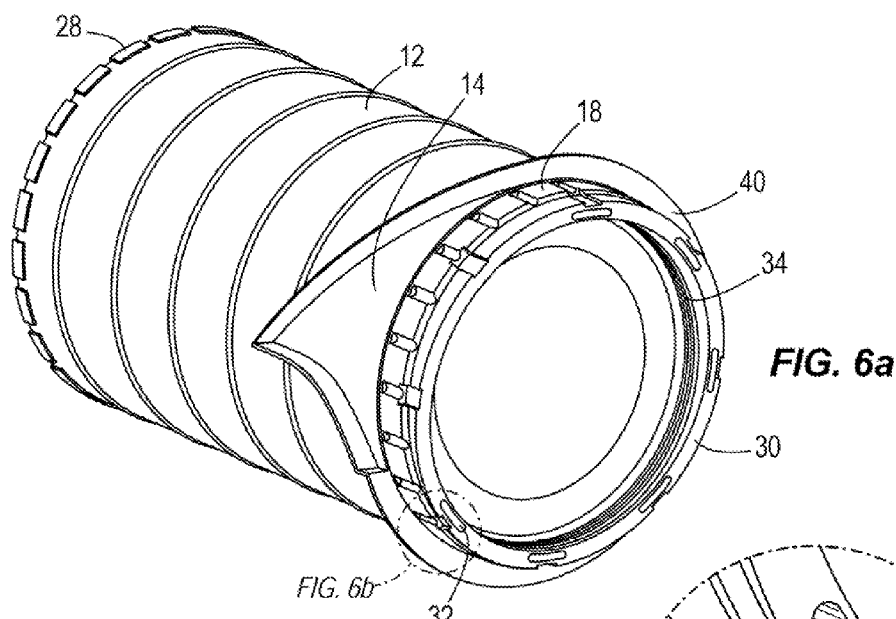
FIG. 6 illustrates embodiments of orientation element for a filter element and a housing (not shown) including tabs and corresponding slots, male/female chords, and internal radial seals.
Figure 6B:
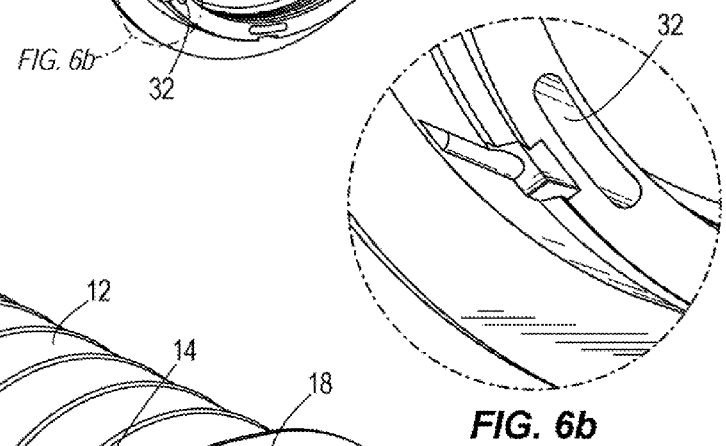
Figure 6C:
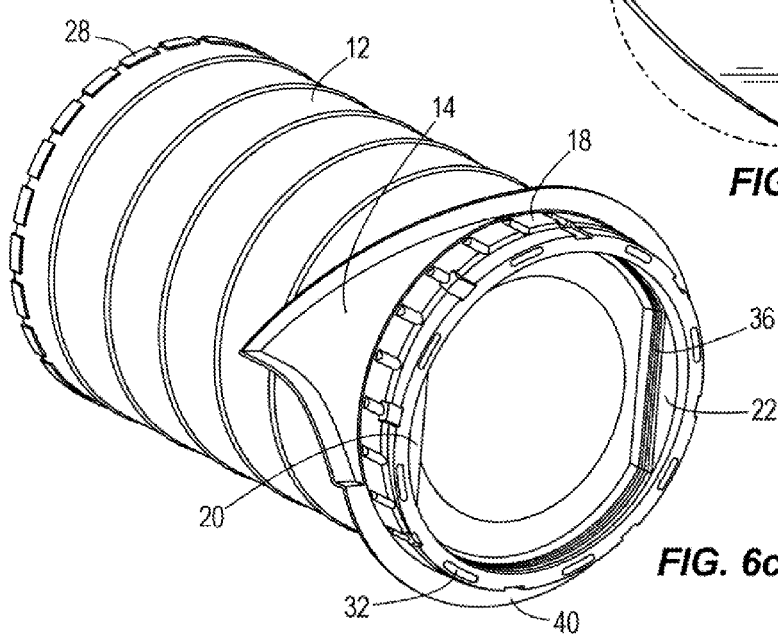
Figure 7A:
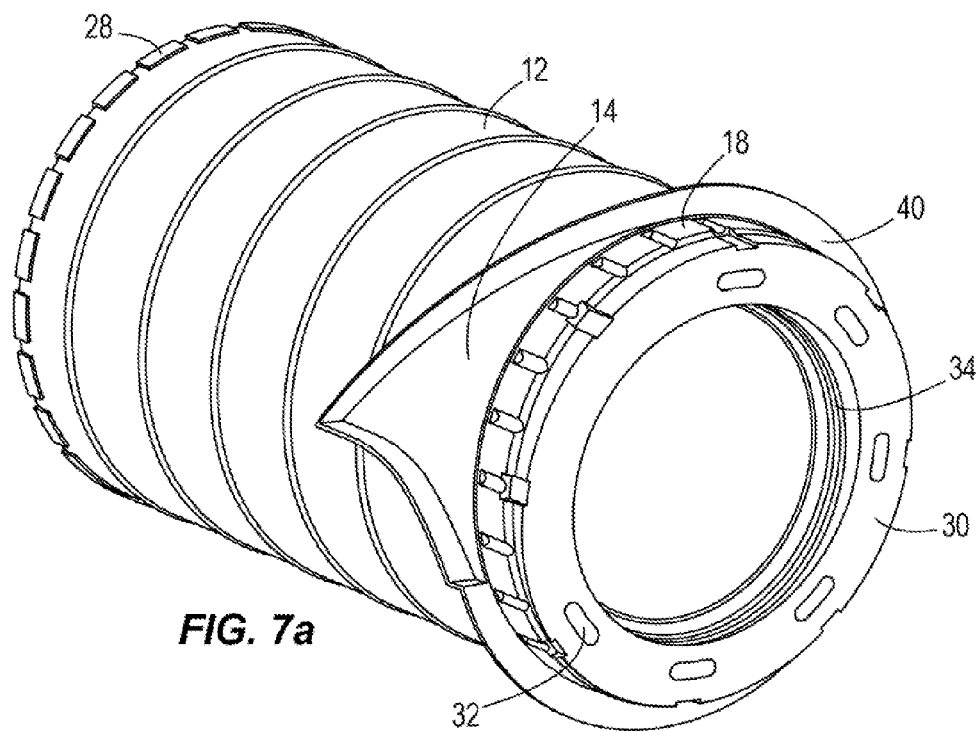
FIG. 7 illustrates embodiments of orientation elements for a filter element and a housing (not shown) including tabs and corresponding slots, male/female chords, and internal radial seals.
Figure 7B:
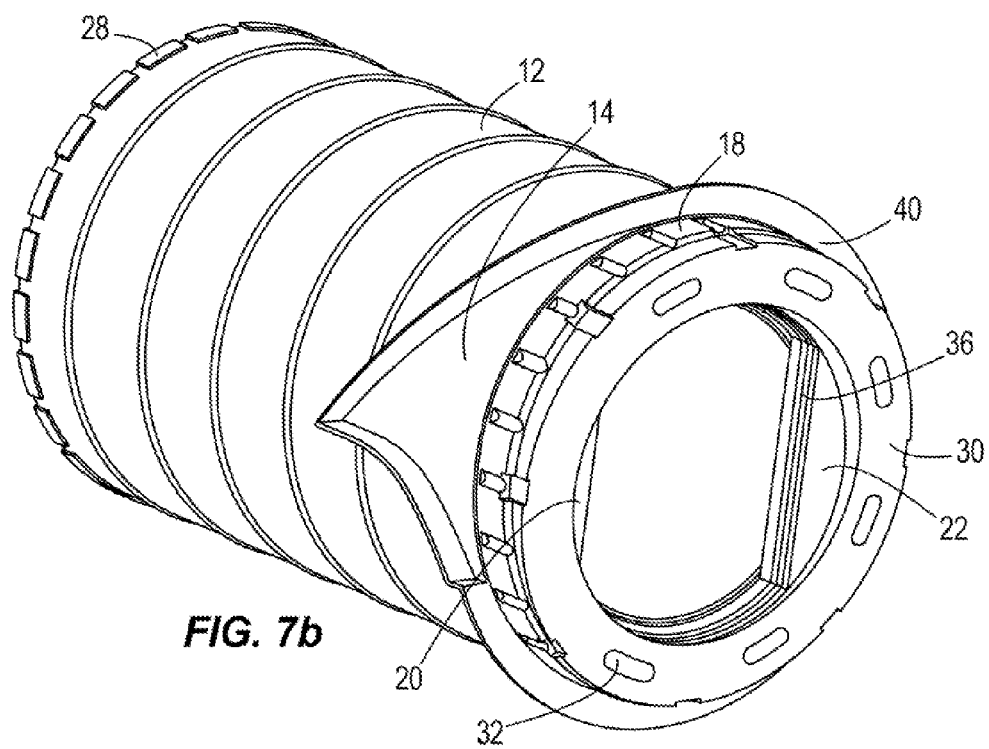

FIGS. 6 and 7 illustrate embodiments of orientation elements for orienting a filter element within a housing chamber. Orientation elements may include a tapered face 30 as in FIG. 5 and a corresponding tapered face on the end cap of the housing chamber (not shown). Orientation elements further may include slots 32 on the end seal cap 8 of the filter element 12 that mate with corresponding tabs on the end cap of the housing chamber (not shown). It should be understood that the reverse mating scheme is contemplated whereby the end seal cap of the filter element includes tabs that mate with corresponding slots on the end cap of the housing chamber. Orientation elements further may include internal mating chords on the end seal cap (20, 22 in FIGS. 6*b* and 7*b*) and corresponding mating chords on the end cap of the housing chamber. (See FIG. 4). The end seal cap further may include internal radial seals 34, 36 for sealing against the outlet 16 of the end cap of the housing chamber. (See FIG. 4). It should be understood that the end caps of the housing further may include radial seals for sealing against the end seal caps of the filter element.

The orientation elements may ensure that the filter element is properly mounted in the housing chamber such that the ramp 14 aligns with the inlet of the housing chamber. As shown in the FIGS. 6 and 7, the ramp 14 may be present on a sleeve 40 as described herein.

Figure 8A:
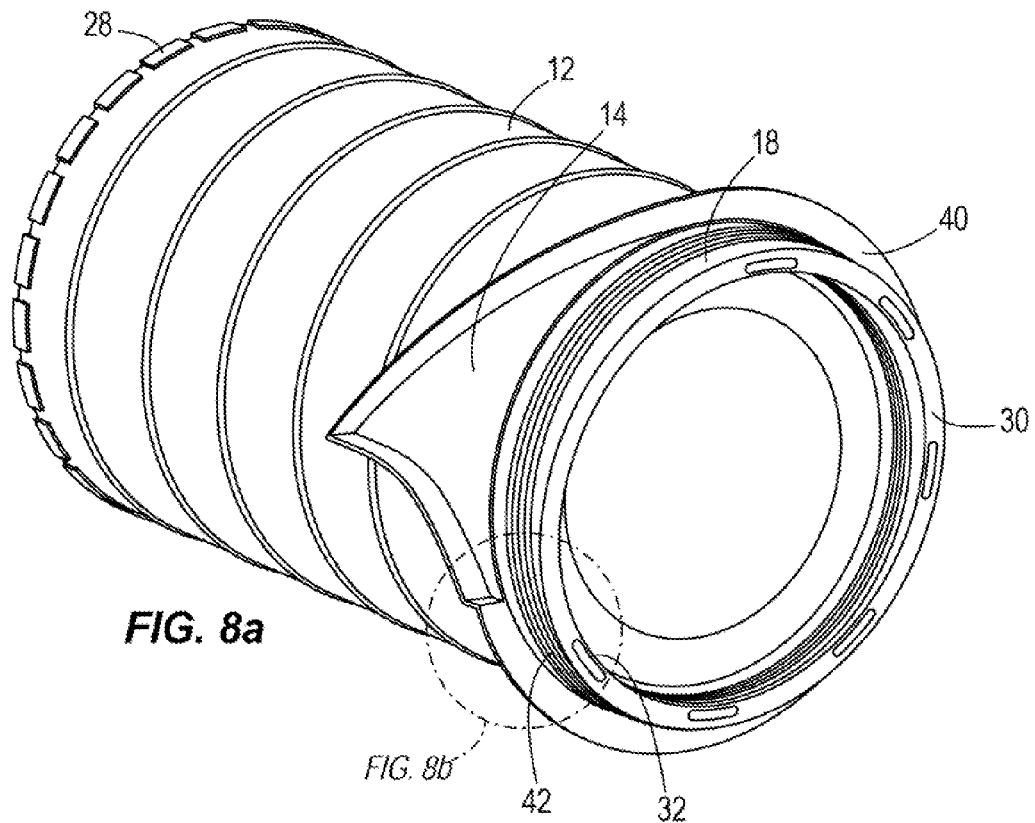
FIG. 8 illustrates one embodiment of orientation elements for a filter element and a housing (not shown) including tabs and corresponding slots and facial sealing elements.
Figure 8B:
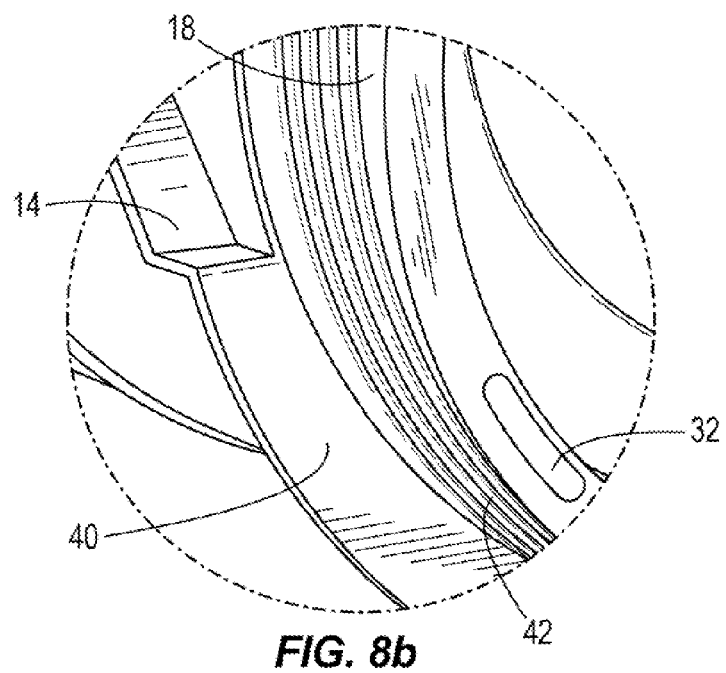
Figures 9A, 9B:
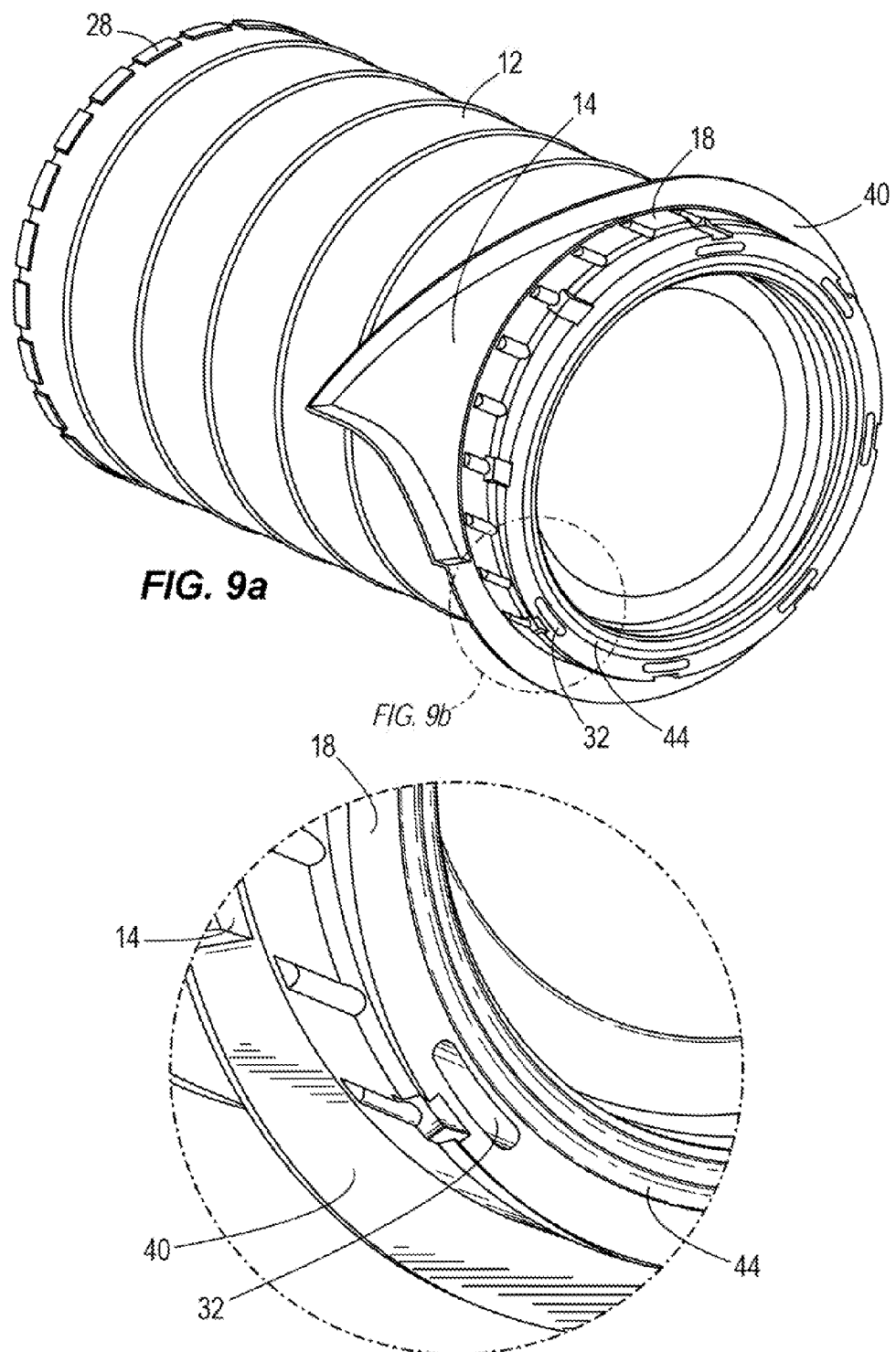
FIG. 9 illustrates one embodiment of orientation elements for a filter element and a housing (not shown) including tabs and corresponding slots and external radial sealing elements.

FIG. 8 illustrates one embodiment of a filter element 12 having an end seal cap 8 with external radial seals 42 for sealing against an end cap of a housing chamber. FIG. 9 illustrates one embodiment of a filter element having an end seal cap 8 with a facial seal 44 for sealing against an end cap of a housing chamber. It should be understood that the end caps of the housing further may include radial seals or facial seals for sealing against the end seal caps of the filter element.

In the foregoing description, certain terms have been used for brevity, clearness, and understanding. No unnecessary limitations are to be implied therefrom beyond the requirement of the prior art because such terms are used for descriptive purposes and are intended to be broadly construed. The different configurations, systems and method steps described herein may be used alone or in combination with other configurations, systems and method steps. It is to be expected that various equivalents, alternatives and modifications are possible.

The invention claimed is:

1. A replaceable air filter element mountable in a housing chamber, the filter element comprising:
    filter media;
    a first end cap seal located at a first end of the filter media, the first end cap seal including an air outlet, the first end cap seal including a ramp that aligns with an inlet of the housing chamber when the filter element is received within the housing chamber, the ramp configured to direct influent air around the filter media and axially upward along the filter media; and
    a second end cap seal located at a second end of the filter media.

2. The element of claim 1 further comprising a sleeve adjacent to the first end cap seal, the ramp forming part of the sleeve.

3. The element of claim 1, wherein the element is substantially cylindrical in shape and comprises substantially cylindrical filter media.

4. The element of claim 3, wherein the housing chamber is substantially cylindrical in shape and comprises the inlet and an outlet, the ramp aligning with the inlet when the element is mounted in the housing chamber and the ramp directing air spirally around the element and axially away from the inlet when air is drawn through the inlet and expelled through the outlet.

5. The element of claim 4, wherein the inlet is a radial inlet and the outlet is an axial outlet.

6. The element of claim 1, wherein the housing chamber comprises end caps located at each end of the housing chamber and the first and second end cap seals of the filter element contact and seal against the end caps of the housing chamber.

7. The element of claim 6, wherein the first and second end cap seals of the filter element contact and seal against the end caps of the housing chamber via facial seals located on the first and second end cap seals of the filter element or on the end cap of the housing chamber.

8. The element of claim 6, wherein the first and second end cap seals of the filter element contact and seal against the end caps of the housing chamber via radial seals located on the first and second end cap seals of the filter element or on the end cap of the housing chamber.

9. The element of claim 6, wherein at least one of the first or the second end cap seals of the filter element and at least one of the end caps of the housing chamber comprise first and second co-acting components mating with each other to at least one of a) orient and permit mounting of the filter element in the housing; and b) permit mounting of only an authorized filter element in the housing, namely a filter element comprising a second co-acting keyed component to mate with a first co-acting keyed component of the housing chamber.

10. The element of claim 9, wherein the first and second co-acting keyed components are non-circular in shape.

11. The element of claim 9, wherein the first and second co-acting keyed components comprise male and female chords.

12. The element of claim 9, wherein the first and second co-acting keyed components comprise a tab and a slot.

13. The element of claim 9, wherein the first and second co-acting keyed components comprise tapered faces.

14. An air filter assembly comprising:
    an air filter element mounted in a housing chamber, the element comprises:
        filter media,
        a first end cap seal located at a first end of the filter media, the first end cap seal including an air outlet and a ramp, and
        a second end cap seal located at a second end of the filter media;
    wherein the housing chamber comprises an inlet and an outlet, the ramp aligning with the inlet when the element is mounted in the housing chamber, and the ramp directing air around the element and axially away from the inlet when air is drawn through the inlet and expelled through the outlet.

15. The assembly of claim 14 further comprising a sleeve adjacent to the first end cap seal, the ramp forming part of the sleeve.

16. The assembly of claim 14, wherein the element is substantially cylindrical in shape and comprises substantially cylindrical filter media, the housing chamber is substantially cylindrical in shape, and the ramp directs air spirally around the element.

17. The assembly of claim 14, wherein the inlet is a radial inlet and the outlet is an axial outlet.

18. The assembly of claim 14, wherein the housing chamber comprises end caps located at each end of the housing chamber and the first and second end cap seals of the filter element contact and seal against the end caps of the housing chamber.

19. The assembly of claim 18, wherein the first and second end cap seals of the filter element contact and seal against the end caps of the housing chamber via facial seals located on the first and second end cap seals of the filter element or on the end cap of the housing chamber.

20. The assembly of claim 18, wherein the first and second end cap seals of the filter element contact and seal against the end caps of the housing chamber via radial seals located on the first and second end cap seals of the filter element or on the end cap of the housing chamber.

21. The assembly of claim 18, wherein at least one of the end seal caps of the filter element and at least one of the end caps of the housing chamber comprise first and second co-acting components mating with each other to at least one of: a) orient and permit mounting of the filter element in the housing; and b) permit mounting of only an authorized filter element in the housing, namely a filter element comprising a second co-acting keyed component to mate with a first co-acting keyed component of the housing chamber.

22. The assembly of claim 21, wherein the first and second co-acting keyed components are non-circular in shape.

23. The assembly of claim 21, wherein the first and second co-acting keyed components comprise male and female chords.

24. The assembly of claim 21, wherein the first and second co-acting keyed components comprise a tab and a slot.

25. The assembly of claim 21, wherein the first and second co-acting keyed components comprise tapered faces.

* * * * *